United States Patent [19]
Walker et al.

[11] Patent Number: 6,008,313
[45] Date of Patent: Dec. 28, 1999

[54] POLYAMIDE CURING AGENTS BASED ON MIXTURES OF POLYETHYLENEAMINES AND PIPERAZINE DERIVATIVES

[75] Inventors: Frederick Herbert Walker, Allentown; William Edward Starner, Nesquehoning; Andrea Karen Smith, Emmaus, all of Pa.

[73] Assignee: Air Products and Chemicals, Inc., Allentown, Pa.

[21] Appl. No.: 08/974,284

[22] Filed: Nov. 19, 1997

[51] Int. Cl.[6] .................................................... C08G 59/44
[52] U.S. Cl. ...................... 528/123; 525/420.5; 525/423; 528/94; 528/118
[58] Field of Search .................. 525/420.5, 423; 528/94, 118, 123

[56] References Cited

U.S. PATENT DOCUMENTS

| | | | |
|---|---|---|---|
| 2,450,940 | 10/1948 | Cowan et al. | 260/404.5 |
| 2,705,223 | 3/1955 | Renfrew et al. | 260/18 |
| 3,919,142 | 11/1975 | Asai et al. | 260/18 PN |
| 5,021,482 | 6/1991 | Wozniak | 524/100 |
| 5,296,556 | 3/1994 | Frihart | 525/423 |

FOREIGN PATENT DOCUMENTS

| | | |
|---|---|---|
| 266519 | 7/1990 | Czechoslovakia . |
| 0203349 | 12/1986 | European Pat. Off. . |
| 0423577 | 4/1991 | European Pat. Off. . |

*Primary Examiner*—Robert Dawson
*Assistant Examiner*—D. Aylward
*Attorney, Agent, or Firm*—Michael Leach

[57] ABSTRACT

Compositions of amine terminated polyamide resins useful for curing epoxy resins are disclosed comprising combinations of fatty mono-acids, dimer acids, polyethyleneamines, and piperazine ring containing polyamines having an N—H functionality of 2 or 3 per mole selected from the group consisting of piperazine, or N-aminoalkylpiperazine, where the alkyl chain is a C2 to C6 alkyl chain, wherein the ratio of equivalents of fatty mono-acid to dimer acid can range from about 0.001:1 to about 1:1, the ratio of moles of piperazine ring containing polyamine to polyethylene amine can range from about 0.1:1 to about 1:1, and the ratio of moles of polyamine to equivalents of acid can range from about 0.6:1 to about 1.2:1. Coating compositions comprising these polyamide resins are also disclosed.

25 Claims, No Drawings

POLYAMIDE CURING AGENTS BASED ON MIXTURES OF POLYETHYLENEAMINES AND PIPERAZINE DERIVATIVES

FIELD OF THE INVENTION

This invention relates to polyamide curing agents for epoxy resins useful for the preparation of coatings and related products.

BACKGROUND OF THE INVENTION

Coatings based on epoxy resins are important industrial products. The largest volume of these products is used for the protection and decoration of large metal or concrete structures such as bridges, ships, industrial tanks, etc., where application of the coating must be performed under ambient conditions. Epoxy coatings of this type have proven themselves to offer an excellent combination of corrosion resistance, water resistance, abrasion resistance, solvent resistance and other desirable coatings properties, and do so in a cost effective manner.

Most epoxy resin coatings designed for ambient application employ polyfunctional amines as the curing agent, either alone or in some cases in combination with other curing agents. Several classes of amine curing agents are used commercially, including aliphatic amines, amidoamines, amine adducts, Mannich bases, and polyamides. They are described more fully in W. R. Ashcroft, *Curing Agents for Epoxy Resins*, in B. Ellis (ed.), *Chemistry and Technology of Epoxy Resins*, Blackie Academic and Professional, London, 1993, pp.37–71.

Among these curing agents, polyamides are a particularly important class of curing agent for the formulation of coatings. Polyamides comprise the reaction products of dimerized fatty acid (dimer acid) and polyethyleneamines, and usually but optionally, a monomeric fatty acid. Dimer acid is prepared by the oligomerization of certain monomeric fatty acids, usually tall oil fatty acid (TOFA), though sometimes other vegetable acids are substituted. Commercial products generally consist of mostly (>70%) dimeric species, with the rest consisting mostly of trimers and higher oligomers, along with small amounts (generally less than 5%) of monomeric fatty acids. Any of the higher polyethyleneamines can be employed in the preparation of polyamides, such as diethylenetriamine (DETA), triethylenetetramine (TETA), tetraethylenepentamine (TEPA), or pentaethylenehexamine (PEHA), though in actual commercial practice the polyethyleneamine most commonly employed is TETA.

Polyamides are employed because they allow for the formulation of coatings with an excellent combination of water and corrosion resistance, most likely due to the hydrophobicity imparted by the fatty nature of the starting materials. They also can offer excellent flexibility, reasonable cure speeds (drying times), and less of a tendency to exude to the surface to cause surface appearance problems (known in the industry as exudate, blush and bloom) than some of the other hardener classes. In addition, due to the relatively low cost of fatty acids and dimer acid, polyamides are among the most cost effective of curing agents available.

Nevertheless, there are several properties of polyamide curing agents that would benefit from improvement.

As a result of environmental regulations, and also as the need to reduce solvent levels in coatings has been perceived by coatings manufacturers and their customers, there has been a need to reduce the viscosity of the binders employed in coatings, and epoxy based coatings are no exception. Polyamide curing agents have for some time been supplied in several grades of differing viscosity. Thus, one manufacturer (Air Products and Chemicals, Inc.) offers polyamide curing agents with a viscosity of about 330,000 cP at room temperature (Ancamide® 220), 40,000 cP (Ancamide 260A), and 11,000 cP (Ancamide 350A). However, as the viscosity of the curing agent is reduced in these products, it is generally found the amine hydrogen equivalent weight (AHEW) also decreases. For the polyamides described above, the AHEWs are 185, 120, and 100 respectively.

Epoxy resins are also available in many viscosities. The most commonly employed epoxy resins are those based upon the diglycidyl ether of bisphenol-A (DGEBA), and higher molecular weight oligomers prepared by the advancement of DGEBA with additional bisphenol-A. Such epoxy resins are generally difunctional or slightly less than difunctional, and characterized by their epoxy equivalent weight (EEW). Thus, bisphenol-A derived epoxy resin with an equivalent weight of 180 has a viscosity of about 8500 cP. Slightly increasing the EEW to 190 increases the viscosity to about 12,000 cP. At an equivalent weight of about 300 or so epoxy resins partially crystallize at a fairly rapid rate to a semi-solid, and above an equivalent weight of about 400 they are solids, and thus their viscosities cannot be measured at room temperature.

However, extrapolations of solvent cut samples of epoxy resins with EEWs in the range of 450 to 500 to 100% solids content suggest that the viscosity is at least many millions of cP at room temperature.

In the formulation of coatings, it is frequently advantageous to employ higher molecular weight epoxy resins, such as those with an equivalent weight of 450 to 500 (known in the industry as '1 type' resins). High molecular weight resins dramatically decrease the dry-to-touch time of the coating. Furthermore, higher molecular weight epoxy resins yield more flexible and impact resistant coatings than do lower molecular weight epoxy resins. Unfortunately, the high viscosity of the higher molecular weight epoxy resins requires the use of high levels of solvent in order to achieve a suitable application viscosity.

An approach to reducing the amount of solvent required in a coating formulation is to employ hardeners with reduced viscosity. However, as shown above, polyamide curing agents with lower viscosities also have lower equivalent weights. Normally, epoxy resins are combined with hardeners at stoichiometries of about 1:1 epoxy groups per amine hydrogen. At this ratio, most properties of the film, such as tensile strength, crosslink density, solvent resistance, etc., tend to be optimized. Consider 1:1 stoichiometric formulations based on 500 parts of a 500 EEW epoxy resin with a viscosity of many millions cP (on a solids basis), and the commercial polyamide curing agents described above. The formulation with Ancamide 220 curing agent contains 185 parts of a hardener with a 330,000 cP viscosity. The Ancamide 220 curing agent cuts the viscosity to some intermediate level. In formulation with Ancamide 350A curing agent, the curing agent has a viscosity of only 11,000 cP, but only 100 parts are used to dilute the epoxy resin. In practice, the final viscosities of these formulations are not dramatically different, and thus there is only a modest decrease in the amount of solvent required in the coating. Clearly, there is a need for low viscosity polyamide curing agents with higher equivalent weights than polyamides of the current art.

In many cases, restrictions on the use of solvents require that low molecular weight epoxy resins be used in place of the preferred, higher molecular weight epoxy resins irrespective of the viscosity curing agent employed. As mentioned above, this increases the dry-to-touch time of the coating. Thus, there is a need for curing agents that reduce dry-to-touch times of epoxy coatings, particularly those based on liquid epoxy resins.

As mentioned above, there is a tendency for curing agents to rise to the surface of a coating during the cure. This can leave a greasy film on the surface of the coating which detracts from the appearance and which can also lead to intercoat adhesion failure if the epoxy is a primer or midcoat. Under adverse application conditions such as high humidity, concentration of the amines at the surface can result in the formulation of whitish precipitates on the surface which are probably bicarbonate and/or carbamate salts, a problem known in the industry as blush. While polyamides are better than certain classes of curing agents, particularly amidoamines and unmodified polyethyleneamines, in this regard, they are still far from perfect. In addition, the high viscosity polyamides of the current art tend to exhibit less exudate and blush than the lower viscosity polyamides. It is found that by waiting a period of time, generally 0.5 to 1 hour or more after mixing the epoxy and amine components of the formulation, exudate and blush can be reduced or even eliminated. This is known as an induction time.

As solvent levels and epoxy molecular weight have been reduced in epoxy coating formulations, however, it has been found that pot lives have also been reduced. The pot life is the time available after mixing the amine and epoxy components of the formulation during which the viscosity remains low enough to allow application. The decrease in pot life is the result of simple chemical kinetics: reduction of solvent content and equivalent weight both result in an increase in the concentration of functional groups, and hence an increase in the rate of reactions that lead to increased viscosity. Thus, there is a need for curing agents with decreased exudate and blush, so that induction times can be reduced or eliminated.

For good protection of metallic substrates, it is necessary that the coating maintain good adhesion to the substrate, particularly under wet conditions such as the Cleveland condensing humidity test. While epoxy coatings generally have good adhesion, there is still a need for improved adhesion, particularly over poor substrates such as cold-rolled steel (CRS).

Finally, there is a need for curing agents that can lead to epoxy coating compositions with greater corrosion resistance, leading to coatings with longer life in service.

U.S. Pat. No. 2,450,940 and U.S. Pat. No. 2,705,223 both describe the preparation of polyamide resins useful for curing epoxy resins by the condensation of dimerized or polymerized fatty acids with polyethyleneamines such as ethylenediamine (EDA) and DETA.

U.S. Pat. No. 5,021,482 describes the preparation of polyamides from polymerized fatty acid and a mixture of amines comprising a polyalkylene polyamine and an N-aminoalkyl-piperazine, preferably N-aminoethylpiperazine (AEP). The polyamides are utilized as adhesion promoters for PVC plastisols. Because high amine content in such an adhesion promoter destroys the acid catalysts employed in top coats applied to such plastisols, this invention is directed toward the preparation of polyamides with an amine value less than about 225. In order to achieve these low amine values, the percent by weight of amines utilized is less than 30%, preferably less than 25%. Although no viscosity of the neat polyamides prepared in '482 is reported, the viscosity of the product of example 1 is 8,880 cP at 25° C., at a calculated solids of only 50%, assuming that 1 mole of water is lost for every 295 g of polymerized fatty acid in the composition. Thus, these products are very high in viscosity, and of little value in modern coatings applications, where environmental regulations require that only limited amounts of solvent can be utilized in the final coating formulation.

CS 266519 discloses an extremely broad range of polyamide resins prepared by condensing carboxylic acids (av. mol. wt. 146–650) with polyamines composed of 20–90% aliphatic polyamines $H_2N(CH_2CH_2NHCH_2CH_2)_{1-4}NH_2$ and 10–80% heterocyclic polyamines $H_2N(CH_2CH_2NH)_{0-4}CH_2CH_2Z(CH_2CH_2N)_{0-4}H$.

SUMMARY OF THE INVENTION

By incorporating a specific range of amounts of piperazine ring containing polyamines having an N—H functionality of 2 or 3 per mole selected from the group consisting of piperazine and N-aminoalkylpiperazine into polyamide compositions comprising fatty acid, dimer acid, and a polyethyleneamine, polyamide curing agents are produced which have a higher amine hydrogen equivalent weight (AHEW) at comparable viscosity than polyamides of the current art. Furthermore, incorporation of these polyamides into epoxy coating formulations results in coatings with lower solvent content, faster dry speed, improved wet adhesion, reduced exudate, and improved corrosion resistance relative to polyamides of the current art.

DETAILED DESCRIPTION OF THE INVENTION

The fatty acids of the current invention are those composed primarily of C12 to C22 monocarboxylic acids containing from 0 to about 4 units of unsaturation. Usually, such fatty acids will be mixtures derived from triglycerides of natural products. Pure fatty acids or mixtures of pure fatty acids, such as stearic, palmitic, oleic, linoleic, linolenic, etc. acids may also be employed, as can various esters of any of these fatty acids, particularly the $C_1$ to $C_4$ esters and triglyceride esters of glycerol and the fatty acid. Also of utility is isostearic acid, also known as monomer acid. Monomer acid is the mostly C18 fatty mono-acid stream derived from the preparation of dimer acid.

The preferred fatty acids are tall oil fatty acid and soya fatty acid. The most preferred fatty acid is tall oil fatty acid.

"Dimerized" or "dimer" or "polymerized" fatty acid refers, in a general way, to polymerized acids obtained from unsaturated fatty acids. They are described more fully in T. E. Breuer, 'Dimer Acids', in J. I. Kroschwitz (ed.), *Kirk-Othmer Encyclopedia of Chemical Technology*, 4$^{th}$ Ed., Wiley, New York, 1993, Vol. 8, pp. 223–237. They are prepared by polymerizing fatty acids under pressure, and then removing most of the unreacted fatty mono-acids by distillation. The final dimeric acid product usually consists of some fatty mono-acid, mostly dimeric acids, and trimeric and higher acids. The dimeric acid product can be prepared with various, controlled levels of fatty mono-acids. The ratio of dimeric acids to trimeric and higher acids is variable, depending on processing conditions and the unsaturated acid feedstock. The dimer acid may also be further processed by, for example, hydrogenation, which reduces the degree of unsaturation and the color of the product. Suitable for the purposes of the present invention are dimer acids with a mono-acid content ranging from greater than 0 to about 26 wt %, a dimer content ranging from about 30 to 97 wt %, and a trimer and higher mer content of from about 3 to 70 wt %. However, as the amount of trimer acid is increased, it will be necessary to increase the amount of polyamine and/or the amount of fatty mono-acid in order to maintain the desired viscosity of the final product, since the higher functionality of the trimeric and higher fatty acids will lead to more branching and increase of molecular weight in the product, as will be appreciated by those skilled in the art. Esters of dimer acids, particularly the $C_1$ to $C_4$ alkyl esters, can also be employed in the current invention.

Preferred dimer acids are those compositions prepared with a range of dimeric acids from 75% to 90% from, for example, the unsaturated fatty acids oleic and linoleic acids and others obtained form sources such as TOFA, soya fatty acid, rapeseed fatty acid, and the like, and most preferred are Empol 1018 and Empol 1019 dimer acids (Henkel Corp.), Sylvadym T-18 dimer acid (Arizona Chem.), and Unidyme 18 dimer acid (Union Camp).

The ratio of equivalents of fatty mono-acid in the reaction mixture to dimer acid can be varied from about 0.001:1 to about 1:1, preferably from 0.05:1 to 0.35:1, and most preferably from 0.15:1 to 0.25:1. The equivalents of acid can be obtained by titration with alcoholic hydroxide, as is well known in the art.

Although a fatty mono-acid is a required component of the reaction mixture which can be added separately, the requisite fatty mono-acid component may be present in the dimer acid component because the dimer acid component, as a result of its manufacture, will most likely contain some starting fatty mono-acid. In addition, the dimer acid may be processed to supply the requisite equivalent amount of fatty mono-acid, or optionally, supplemental fatty mono-acid may be added.

The polyethyleneamines of the current invention are those of the structure:

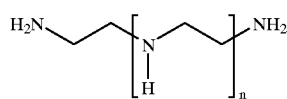

where n is an integer ranging from 1 to about 6. It will be appreciated by those skilled in the art that polyethyleneamines of commerce where n is greater than or equal to 2 are not pure products, but are mixtures that also contain substantial portions of branched and cyclic congeners, where congeners refers to species that contain the same number of heteroatoms, in this case nitrogen. Thus, TETA contains not only the linear structure with n=2 shown above, but also the branched isomer:

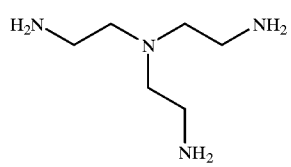

and the following two cyclic congeners:

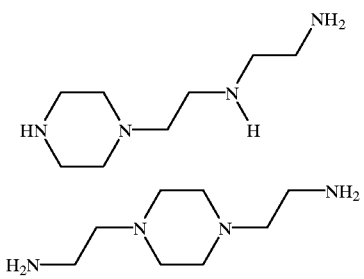

Mixtures of polyethyleneamines can be employed as well. Examples of polyethyleneamines include DETA, TETA, TEPA, PEHA, and the higher polyethyleneamines. The preferred polyethyleneamines are TETA and TEPA.

The piperazine ring containing polyamines having an N—H functionality of 2 or 3 per mole are selected from the group consisting of piperazine and N-aminoalkyl-piperazine, where the alkyl chain is a C2 to C6 alkyl chain. Preferred piperazine ring containing polyamines are piperazine and N-aminoethylpiperazine. It has been discovered that condensation of AEP with carboxylic acids occurs preferentially on the primary amine, leaving only one active hydrogen for reaction with epoxy resin. If piperazine reacts on only one end with a carboxylic acid, it likewise leaves only one active hydrogen for reaction with epoxy resin. In this way, the equivalent weight of the final polyamide is increased, leading to the desirable result of reduced viscosity when formulated with high viscosity epoxy resin.

The ratio of moles of piperazine ring containing polyamine to polyethyleneamine is also crucial to the practice of this invention. As is obvious from the above, this ratio has a significant effect on the AHEW of the final product. It has also been determined that adhesion to cold rolled steel (CRS) substrates after exposure to condensing humidity is improved by including piperazine ring containing polyamines in the polyamide composition. The ratio of moles of piperazine ring containing polyamine to polyethyleneamine can range from about 0.1:1 to about 1:1, preferably from 0.3:1 to 0.8:1.

The ratio of total moles of polyamine (including the piperazine ring containing polyamines) to equivalents of acid is a crucial parameter in determining the properties of the resulting polyamides. This parameter will have a large influence on the molecular weight and hence the viscosity of the polyamide produced. Indeed, if the excess of amine to acid is not large enough, then the entire composition can gel. Furthermore, this ratio also influences the AHEW of the final product, and has an effect upon the amount of unreacted polyamine present after completion of the condensation reaction. Suitable ratios of moles of polyamine to equivalents of acid range from about 0.6:1 to about 1.2:1, preferably from 0.9:1 to 1.15:1.

If desired, the composition can be optionally modified by the incorporation of additional polyethylene amine or other polyamines. Examples include meta-xylylene diamine, the various isomers of diaminocyclohexane, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly(cyclohexyl-aromatic)amines (MBPCAA) described in U.S. Pat. No. 5,280,091, 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexane-diamine, 3,5,5-trimethyl-1,6- hexanediamine, 2-methyl-1,5-pentanediamine, bis-(3-amino-propyl)amine, N,N'-bis-(3-aminopropyl)- 1,2-ethanediamine, N-(3-aminopropyl)-1,2-ethanediamine, 1,2-diaminocyclohexane, 1,3-diaminocyclohexane, 1,4-diaminocyclo-hexane, the poly(alkylene oxide) diamines and triamines (such as for example Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, and Jeffamine ED-2001 polyamines). The composition can be modified by adding these polyamines to the polyamide after completion of the condensation reaction.

Polyamides of the current invention can be manufactured by any number of processes known to those skilled in the art. Normally, the amines and acids are combined at temperatures ranging from about room temperature to about 100° C. Heat is then supplied to raise the temperature as water is condensed from the reaction mixture. Heating is normally continued until the specified amount of water is removed that will yield a product with the desired imidazoline and amide content. Optionally, vacuum can be applied particularly in the late stages of the process to aid in the removal of water from the mixture. To reduce foaming, which can be a problem particularly under vacuum conditions, small amounts of defoamers may be added to the polyamide composition. Appropriate defoamers include various acrylic copolymers containing 2-ethylhexyl acrylate as part of the copolymer composition, various polysiloxane copolymers, and the like.

An alternative approach to the preparation of polyamide compositions of the current invention is to prepare separately one or more products using the components required for the polyamide composition described above, and then blending those separately prepared products, possibly with some of the components, to form a final mixture which falls within the guidelines given above for the ratio of equivalents of fatty mono-acid to dimer acid, the ratio of moles of piperazine ring containing polyamine to polyethyleneamine, and the ratio of total moles of polyamine to equivalents of acid.

For example, the following reaction products could be prepared by reacting variations of the individual components:

a polyethyleneamine and a dimer acid;
a piperazine-containing polyamine and a dimer acid;
a piperazine-containing polyamine and a fatty mono-acid;
a polyethyleneamine and a fatty mono-acid;
a polyethyleneamine, a piperazine-containing polyamine and a dimer acid;
a polyethyleneamine, a piperazine-containing polyamine and a fatty mono-acid;
a polyethyleneamine, a piperazine-containing polyamine, a dimer acid and a fatty mono-acid;
a polyethyleneamine, a dimer acid and a fatty mono-acid; and
a piperazine-containing polyamine, a dimer acid and a fatty mono-acid;

These reaction products could then be blended within certain ranges, with or without the addition of one or more of the individual components, to form compositions falling within the scope of this invention. The process for the preparation of the polyamides of the present invention described above can also be employed for the preparation of the reaction products listed above that are further blended.

To form the protective and/or decorative coating compositions of the invention the polyamide hardener is combined with an epoxy resin which is a polyepoxy compound containing more than one 1,2-epoxy groups per molecule. Such epoxides are well known in the epoxy coating art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 Columns 5/6 to 6/20. The preferred polyepoxy compounds are the diglycidyl ethers of bisphenol-A, the advanced diglycidyl ethers of Bisphenol-A, the diglycidyl ethers of and bisphenol-F, and the epoxy novolac resins.

To reduce the viscosity of a given formulation of polyamides of the current invention with a more-than-one-functional epoxy resin, the epoxy resin may be modified with a portion of monofunctional epoxide. In this way viscosity is further reduced, which may be advantageous in certain cases, such as for example to increase the level of pigment in a formulation while still allowing easy application, or to allow the use of a higher molecular weight epoxy resin. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, 2-ethylhexanol, and C8 to C14 alcohols and the like.

Polyamides of the current invention would normally be formulated with epoxy resins at stoichiometric ratios of epoxy groups to amine hydrogen ranging from about 1.5 to 1 to about 1 to 1.5. More preferred are ranges from 1.2 to 1 to 1 to 1.2, and most preferred are 1.1 to 1 to 1 to 1.1.

It is also possible to modify the polyamides of the current invention by reacting a modest portion of the amine hydrogen with difunctional and monofunctional epoxy resins such as those described below. This is a common practice well known to those skilled in the art, and generally referred to as adduction. By adducting with difunctional and monofunctional epoxy resins it is possible to improve the compatibility of the polyamide with epoxy resin and thereby reduce problems such as blush, carbonation and exudation as described above, and to increase pot life. On the other hand, such modification tends to increase viscosity, particularly in the case of difunctional epoxy resins, and may in some cases also decrease the rate of cure. Particularly useful epoxy resins for adduction include the diglycidyl ethers of bisphenol-A, the advanced diglycidyl ethers of Bisphenol-A, the diglycidyl ethers of and bisphenol-F, styrene oxide, cyclohexene oxide, and the glycidyl ethers of phenol, the cresols, tert-butylphenol and other alkyl phenols, butanol, 2-ethylhexanol, and C8 to C14 alcohols and the like.

In some circumstances it may be advantageous to incorporate so-called accelerators for the epoxy-amine curing reaction in formulations based on polyamides of the current invention. Such accelerators are described in H. Lee and K. Neville, Handbook of EpoxY Resins, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris (dimethylaminomethyl)phenol. Normally, such accelerators are used at levels of 10% or less based on the total weight of binder, and more usually at levels of less than 5%.

In some circumstances in may be advantageous to incorporate plasticizers for the epoxy-amine network in formulations based on polyamides of the current invention. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Such plasticizers are well known to those skilled in the art, and are described more fully in D. F. Cadogan and C. J. Howick, 'Plasticizers', in J. I. Kroschwitz, ed., *Kirk-Othmer Encyclopedia of Chemical Technology*, 4$^{th}$ Ed., Wiley, New York, 1996, Vol. 19, pp. 258–290. Particularly useful plasticizers include benzyl alcohol, nonylphenol, and various esters of phthalic acid. The ester plasticizers would normally be incorporated in the same package as the epoxy resin to minimize reaction with the amine curing agent.

Protective or decorative coatings prepared from polyamides of the current invention and epoxy resins can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system while maintaining solubility of the binder components. Suitable solvents include aromatics, aliphatics, esters, ketones, ethers, alcohols, glycols, glycol ethers, and the like. Particularly useful in the formulation are some level of ketones such as acetone, methyl ethyl ketone, methyl isoamyl ketone, methyl propyl ketone, methyl amyl ketone, diacetone alcohol and the like, which can be used to improve pot life with little or no sacrifice in dry speed. If ester solvents are included in the formulation, it is usually necessary to formulate them in the package containing the epoxy resin, so as to minimize their reaction with the amine curing agent.

Coatings of this invention can be applied by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

Coatings of this invention can be applied and cured at ambient temperatures ranging from about 0° C. to about 50° C., with temperatures of 10° C. to 40° C. preferred. If desired, these coatings can also be force cured at temperatures up to 100° C. or more.

EXAMPLES 1–6

The reactants as described in Table 1 were charged to a 1000 mL 4 necked round bottom flask equipped with a mechanical stirrer, thermometer, Dean-Stark distillate collection apparatus, nitrogen purge line and heating mantle. Upon mixing the reactants an exotherm was observed ranging from 60–100° C. depending on the reactant ratio used. The reaction mixture was then slowly heated to distill off the water from the condensation reaction. At about 160° C. water began to distill from the reaction mixture. Heating was continued until the temperature of the reaction mixture reached 250° C. At this point heating was stopped and the reaction mixture was cooled to room temperature and the product collected. The product yields are shown in Table 1 as well as the calculated amine hydrogen equivalent weight and the product viscosity. The Amine hydrogen equivalent weight (AHEW) was calculated using the following formula:

$$AHEW = \frac{\text{Product Weight}}{[\text{Initial equiv. amine hydrogen} - (2 \times \text{equiv. acid}) - \text{equiv. imidazoline formed}]}$$

Where:

Equivalents of imidazoline=moles of water produced–theoretical moles of water for amide Examples 4, 5 and 6 according to the invention use a combination of low functionality (2–3 equivalents/mole) piperazine containing amines such as piperazine or aminoethylpiperazine (AEP) and a higher functionality polyethyleneamine such as triethylenetetramine (TETA) or tetraethylenepentamine (TEPA). This combination provides a product with an amine hydrogen equivalent weight (AHEW) ranging from 155.7 to 170.1 and a viscosity ranging from 34,000 to 68,800 cps. If either a low functionality amine such as AEP (Example 1) or a higher functionality polyethyleneamine such as TETA (Example 2) are used alone for polyamide synthesis at the same stoichiometry, the resulting polyamides have a significantly higher (406.1) or lower (118.8) AHEW, Examples 1 and 2 respectively. By adjusting the stoichiometry from 0.99 to 0.80 a polyamide having a AHEW of 166.0 can be produced from a higher polyethyleneamine such as TETA but the viscosity is substantially higher at 146,000 cps (Example 3). These examples show that only through the combination of a low functionality piperazine amine and the higher functionality polyethyleneamine can a polyamide be prepared which has the desired combination of high AHEW and low viscosity.

TABLE 1

| Example No. | 1 | 2 | 3 | 4 | 5 | 6 |
|---|---|---|---|---|---|---|
| Molar Ratios | | | | | | |
| Amine/Acid (mol/eq) | .99 | .99 | .8 | .99 | .99 | .99 |
| Amine Ratio(mole/mole/. . .) | 1.0 | 1.0 | 1.0 | 0.6/1.0 | 0.6/0.5/0.5 | 0.3/0.3/1.0 |
| TOFA/Dimer (equiv/equiv) | 0.19 | 0.19 | 0.19 | 0.19 | 0.19 | 0.19 |
| Reactants | | | | | | |
| Dimer Acid$^a$ (g) | 295.00 | 295.00 | 295.00 | 295.00 | 295.00 | 295.00 |
| TOFA$^b$ (g) | 56.05 | 56.05 | 56.05 | 56.05 | 56.05 | 56.05 |
| Piperazine$^c$ (g) | | | | | | 18.95 |
| AEP$^d$ (g) | 153.50 | | | 56.99 | 57.08 | 28.50 |
| TETA$^e$ (g) | | 172.00 | 138.99 | 107.50 | 53.84 | 107.50 |

TABLE 1-continued

| Example No. | 1 | 2 | 3 | 4 | 5 | 6 |
|---|---|---|---|---|---|---|
| TEPA[f] (g) | | | | | | 69.69 |
| Properties | | | | | | |
| Product Yield (g) | 483.14 | 491.75 | 458.33 | 486.09 | 501.16 | 489.20 |
| Product AHEW | 406.1 | 118.8 | 166.0 | 165.4 | 155.7 | 170.1 |
| Amine Value (mg KOH/g) | 265.8 | 363.2 | 284.7 | 324.1 | 343.0 | 285.2 |
| Product Viscosity (cps) | 79,100 | 31,000 | 146,000 | 34,000 | 51,000 | 68,800 |

[a]Sylvadym T-18 dimer acid comprising 2 wt % mono-acid and 83 wt % dimer acid; eq wt = 295 (Arizona Chemical)
[b]Acintol FA-2 fatty mono-acid; eq wt = 295 (Arizona Chemical)
[c]mol wt = 86
[d]mol wt = 129
[e]mol wt = 146
[f]mol wt = 189

EXAMPLE 4b

A large batch of Example 4 was prepared for use in pigmented application testing. Using the synthesis procedure described in Examples 1–6, 1416.0 g of dimer acid, 269.0 g of TOFA, 273.5 g of AEP and 515.8 g of TETA was charged to a 3 liter vessel. The resulting product (2307.2 g) had a viscosity of 31,500 cps, an amine value of 337.1 mg KOH/g and a calculated AHEW of 175.

EXAMPLES 7–11

The synthesis procedure described in Examples 1–6 was used in the preparation of Examples 7–11 using the amount of reactants shown in Table 2. The amount of dimer acid and the ratio of moles of polyamine to equivalents of acid are kept constant while the amount of TOFA, AEP and TETA are varied. The resulting products have a AHEW within the range of 160 to 180 and a viscosity range of 20,000 to 50,000 cps. These examples show that a polyamide curative with lower viscosity at higher AHEW than can be generated with varied amine combinations and TOFA levels.

TABLE 2

| Example No. | 7 | 8 | 9 | 10 | 11 |
|---|---|---|---|---|---|
| Molar Ratios | | | | | |
| Amine/Acid (mol/eq) | 0.96 | 0.96 | 0.96 | 0.96 | 0.96 |
| AEP/TETA (mole/mole) | 0.6 | 0.45 | 0.45 | 0.6 | 0.6 |
| TOFA/Dimer (equiv/equiv) | 0.19 | 0.20 | 0.28 | 0.20 | 0.28 |
| Reactants | | | | | |
| Dimer Acid (g) | 295.00 | 295.00 | 295.00 | 295.00 | 295.00 |
| TOFA (g) | 56.05 | 59.00 | 81.13 | 59.00 | 81.13 |
| AEP (g) | 56.99 | 46.12 | 49.00 | 55.73 | 59.21 |
| TETA (g) | 107.50 | 115.99 | 123.24 | 105.12 | 111.69 |
| Properties | | | | | |
| Product Yield (g) | 486.09 | 484.81 | 516.77 | 483.65 | 514.63 |
| Product AHEW | 165.4 | 167.2 | 163.5 | 169.7 | 178.1 |
| Amine Value (mg KOH/g) | 324.1 | 315.1 | 318.7 | 328.6 | 328.2 |
| Product Viscosity (cps) | 34,000 | 46,000 | 29,250 | 34,800 | 24,870 |

EXAMPLES 12–17

The synthesis procedure described in Examples 1–6 were used in the preparation of Examples 12–17 using the amount of reactants shown in Table 3. The amount of dimer acid and the ratio of moles of polyamine to equivalents of acid are kept constant while the amount of TOFA, AEP and TETA are varied. The resulting products have a AHEW within the range of 119 to 136 and a viscosity range of 6,000 to 15,000 cps. These examples show that a polyamide curative with lower viscosity at higher AHEW than can be generated with varied amine and TOFA levels.

TABLE 3

| Example No. | 12 | 13 | 14 | 15 | 16 | 11 |
|---|---|---|---|---|---|---|
| Molar Ratios | | | | | | |
| Amine/Acid (mol/eq) | 1.08 | 1.08 | 1.08 | 1.08 | 1.08 | 1.08 |
| AEP/TETA (mole/mole) | 0.3 | 0.3 | 0.5 | 0.5 | 0.4 | 0.5 |
| TOFA/Dimer (equiv/equiv) | 0.225 | 0.350 | 0.225 | 0.350 | 0.288 | 0.225 |
| Reactants | | | | | | |
| Dimer Acid (g) | 295.00 | 295.00 | 295.00 | 295.00 | 295.00 | 295.00 |
| TOFA (g) | 66.38 | 103.25 | 66.38 | 103.25 | 84.81 | 66.38 |
| AEP (g) | 42.54 | 46.88 | 61.44 | 67.71 | 55.35 | 58.03 |
| TETA (g) | 160.47 | 176.84 | 139.07 | 153.26 | 153.26 | 131.45 |
| Properties | | | | | | |
| Product Yield (g) | 532.21 | 586.82 | 530.51 | 584.17 | 555.11 | 520.28 |
| Product AHEW | 119.6 | 119.6 | 132.6 | 129.7 | 124.3 | 136.4 |
| Amine Value (mg KOH/g) | 401.6 | 401.7 | 385.3 | 388.5 | 398.1 | 365.8 |
| Product Viscosity (cps) | 10,400 | 6,725 | 11,250 | 8,125 | 10,100 | 15,300 |

EXAMPLES 18–22

Stoichiometric amounts of Ancamide 220 and Ancamide 260A curing agents and the curatives prepared in Examples 4, 5 and 6 and Epon 828 resin (diglycidyl ether of bis phenol A, EEW=190; Shell Chemical Co.) were combined (See Table 4). The viscosity of the epoxy/curative blend was reduced to 300 cps as measured on a Brookfield viscometer by adding the necessary amount of a solvent blend of 50/50 (v/v) n-butanol/xylene. All curatives, Epon 828 resin and solvent mixture were equilibrated to 25° over 24 hours prior to use. After a one hour induction period, 7 mil films were cast on various substrates as predetermined for the following tests:

| Test | ASTM D Method |
|---|---|
| Dry-to-touch Time | 1640 7.5.2 |
| Dry-hard Time | 1640 7.6.1 |
| Impact Resistance | 1794 |
| Cleveland Humidity | 4585 |
| Cross Hatch Adhesion | 3359 |

The thin film set time was measured using a B-K recorder (Paul N. Gardner Co.). The forward and reverse impact resistance and cross hatch adhesion before Cleveland humidity were tested after 7 days of cure at 25° C. and 50% relative humidity. The cross hatch adhesion after Cleveland humidity was determined after 7 days of exposure. The results of these tests are shown in Table 4.

A comparison of the performance results for Examples 20, 21 and 22 using experimental curatives prepared in Examples 4, 5 and 6 with that of commercial Ancamide 220 (Example 18) and Ancamide 260A (Example 19) curatives show that superior performance was obtained with the experimental curatives. Examples 20, 21 and 22 had an AHEW similar to Example 18 (Ancamide 220) and a viscosity similar to Example 19 (Ancamide 260A). These combinations afforded lower theoretical VOC's, shorter thin film set times, dry-to-touch time and dry-hard time while providing equivalent or higher impact resistance both forward and reverse and better cross hatch adhesion after Cleveland humidity.

TABLE 4

| Example No. | 18 | 19 | 20 | 21 | 22 |
|---|---|---|---|---|---|
| Curative | Ancamide 220 | Ancamide 260A | Example 4 | Example 5 | Example 6 |
| Curative AHEW | 185.0 | 120.0 | 165.4 | 155.7 | 170.1 |
| Curative Viscosity (cps) | 330,000 | 40,000 | 34,000 | 51,000 | 68,800 |
| Curative (g) | 49.60 | 38.96 | 46.80 | 45.04 | 47.24 |
| Epon 828 (g) | 50.40 | 61.04 | 53.20 | 54.96 | 52.76 |
| Solvent (g) | 48.20 | 32.48 | 33.60 | 35.00 | 37.40 |
| Theoretical VOC (lb/gal) | 2.64 | 2.23 | 2.08 | 2.15 | 2.24 |
| Thin Film Set Time (hr) | 5.00 | 5.75 | 4.50 | 4.30 | 6.00 |
| Dry-to-Touch Time (hr) | 5.5 | 6.7 | 4.7 | 4.5 | 5.5 |
| Dry-hard Time (hr) | >8.0 | >8.0 | 8.0 | 7.5 | 8.0 |
| Forward Impact Resistance 7 day on CRS (lb) | 144 | 160 | 160 | 160 | 160 |
| Reverse Impact Resistance 7 day on CRS (lb) | 160 | 108 | 160 | 160 | 160 |
| Cross Hatch Adhesion before Humidity on GBS | 4B | 5B | 5B | 5B | 5B |
| Cross Hatch Adhesion after Humidity on GBS | 3B | 4B | 5B | 5B | 5B |

EXAMPLES 23–29

Stoichiometric amounts of Ancamide 220 and Ancamide 260A curing agents and the curatives prepared in Examples 7–11 and Epon 828 resin were combined (See Table 5). The viscosity of the epoxy/curative blend was reduced to 300 cps by adding the necessary amount of a solvent blend of 50/50 (v/v) n-butanol/xylene. All curatives, Epon 828 resin and solvent mixture were equilibrated to 25° over 24 hours prior to use. After a one hour induction period, 7 mil films were cast on various substrates according to the protocol described in Examples 18–22.

A comparison of the performance results for Examples 25–29 using experimental curatives prepared in Examples 7–11 with that of commercial Ancamide 220 (Example 23) and Ancamide 260A (Example 24) curatives show that superior performance was obtained with the experimental curatives. Examples 25–29 had an AHEW similar to Example 23 (Ancamide 220) and a viscosity similar to Example 24 (Ancamide 260A). These combinations afforded lower theoretical VOC's, shorter thin film set times, dry-to-touch time and dry-hard time while providing equivalent or higher impact resistance both forward and reverse and better cross hatch adhesion after Cleveland humidity.

EXAMPLES 30–37

Stoichiometric amounts of Ancamide 260A and Ancamide 350A curing agents and the curatives prepared in Examples 12–17 and Epon 828 resin were combined. (See Table 6) The viscosity of the epoxy/curative blend was reduced to 300 cps by adding the necessary amount of a solvent blend of 50/50 (v/v) n-butanol/xylene. All curatives, Epon 828 resin and solvent mixture were equilibrated to 25 over 24 hours prior to use. After a one hour induction period, 7 mil films were cast on various substrates according to the protocol described in Examples 18–22.

A comparison of the performance results for Examples 32–37 using experimental curatives prepared in Examples 12–17 with that of commercial Ancamide 260A (Example 30) and Ancamide 350A (Example 31) curatives show that superior performance was obtained with the experimental curatives. Examples 32–37 had an AHEW similar to Example 30 (Ancamide 260A) and a viscosity similar to Example 31 (Ancamide 350A). These combinations afforded lower theoretical VOC's, shorter thin film set times, dry-to-touch time and dry-hard time while providing equivalent or higher impact resistance both forward and reverse and better cross hatch adhesion after Cleveland humidity.

TABLE 5

| Example No. | 23 | 24 | 25 | 26 | 27 | 28 | 29 |
|---|---|---|---|---|---|---|---|
| Curative | A 220 | A 260A | Ex 7 | Ex 8 | Ex 9 | Ex 10 | Ex 11 |
| Curative AHEW | 185.0 | 120.0 | 165.4 | 167.2 | 163.5 | 169.7 | 178.1 |
| Curative Viscosity (cps) | 330,000 | 40,000 | 34,000 | 46,000 | 29,250 | 34,800 | 24,870 |
| Curative (g) | 49.60 | 38.96 | 46.80 | 47.07 | 46.52 | 47.44 | 48.65 |
| Epon 828 (g) | 50.40 | 61.04 | 53.20 | 52.93 | 53.49 | 52.56 | 51.35 |
| Solvent (g) | 48.20 | 32.48 | 33.60 | 33.52 | 31.76 | 33.84 | 32.00 |
| Theoretical VOC (lb/gal) | 2.64 | 2.23 | 2.08 | 2.05 | 2.00 | 2.09 | 2.01 |
| Thin Film Set Time (hr) | 5.90 | 5.75 | 4.50 | 4.00 | 4.50 | 3.63 | 4.75 |
| Dry-to-touch Time (hr) | 5.5 | 6.7 | 4.7 | 3.6 | 5.5 | 4.5 | 5.0 |
| Dry-hard Time (hr) | >8.0 | >8.0 | 8.0 | 6.5 | 6.5 | 7.0 | 8.0 |
| Forward Impact Resistance 7 day on CRS (lb) | 144 | 160 | 145 | 160 | 160 | 160 | 160 |
| Reverse Impact Resistance 7day on CRS (lb) | 160 | 108 | 160 | 149 | 160 | 160 | 160 |
| Cross Hatch Adhesion before Humidity on GBS | 4B | 5B | 5B | 5B | 5B | 5B | 5B |
| Cross Hatch Adhesion after Humidity on GBS | 3B | 4B | 5B | 5B | 5B | 5B | 5B |

TABLE 6

| Example No. | 30 | 31 | 32 | 33 | 34 | 35 | 36 | 37 |
|---|---|---|---|---|---|---|---|---|
| Curative | A260A | A350A | Ex 12 | Ex 13 | Ex 14 | Ex 15 | Ex 16 | Ex 17 |
| Curative AHEW | 120.0 | 100.0 | 119.6 | 119.6 | 132.6 | 129.7 | 124.3 | 136.4 |
| Curative Viscosity (cps) | 40,000 | 11,000 | 10,400 | 6,725 | 11,250 | 8,125 | 10,100 | 15,300 |
| Curative (g) | 38.96 | 34.77 | 38.88 | 38.88 | 41.36 | 40.83 | 39.80 | 42.05 |
| Epon 828 (g) | 61.04 | 65.28 | 61.12 | 61.12 | 58.64 | 59.18 | 60.20 | 57.95 |
| Solvent (g) | 32.48 | 26.00 | 26.00 | 24.80 | 27.00 | 26.00 | 27.20 | 26.00 |
| Theoretical VOC (lb/gal) | 2.23 | 1.89 | 1.75 | 1.69 | 1.79 | 1.74 | 1.80 | 1.74 |
| Thin Film Set Time (hr) | 5.75 | 6.75 | 3.88 | 4.25 | 4.13 | 4.5 | 3.88 | 3.13 |
| Dry-to-touch Time (hr) | 6.7 | 6.2 | 5.8 | 5.5 | 5.5 | 5.5 | 5.5 | 4.6 |
| Dry-hard Time (hr) | >8.0 | >8.0 | 7.3 | 6.8 | 6.5 | 6.4 | 6.8 | 7.9 |
| Forward Impact Resistance 7 day on | 160 | 156 | 160 | 160 | 160 | 160 | 160 | 160 |

TABLE 6-continued

| Example No. | 30 | 31 | 32 | 33 | 34 | 35 | 36 | 37 |
|---|---|---|---|---|---|---|---|---|
| CRS (lb) | | | | | | | | |
| Reverse Impact Resistance 7 day on CRS (lb) | 108 | 136 | 160 | 160 | 160 | 160 | 160 | 160 |
| Cross Hatch Adhesion before Humidity on GBS | 5B | 5B | 5B | 5B | 5B | 5B | 5B | 5B |
| Cross Hatch Adhesion after Humidity on GBS | 4B | 3B | 5B | 5B | 5B | 5B | 5B | 5B |

EXAMPLE 38

In a stainless steel vessel was placed 191.4 g DER-671 PM75 epoxy resin (75% solids epoxy resin in PM solvent, EEW=617 as is; Dow Chemical Co.), 174.0 g Epon 828, 60 g PM (Eastman Chemical Co.) and 61.1 g Aromatic 100 (Exxon Chemical Co.). The ingredients were thoroughly mixed at low speed using a dispersator equipped with a Cowles blade. Next, a mixture of 144.3 g Phosguard J-0813 (Mineral Pigments Corp.), 210.5 g Sparmite F (Harcross Pigments Inc.), 90.2 g Chromium Oxide G-409 (Harcross Pigments, Inc.), and 156.4 g Wollastocoat 10AS (NYCO Mincerals, Inc.) was added with slow mixing. The speed was then increased to the maximum obtainable without generating turbulent flow. After 10 minutes a Hegman grind of 6.5 was obtained. The stirring speed was reduced so that the vortex of the mixture did not reach the top of the Cowles blade, and 24.8 g of Disparlon 6900–20X (King Industries, Inc.) was added and then stirred for 30 minutes. Finally, a mixture of 37.3 g Nevoxy EPX-L5 (Neville Chemical Co.), 33.8 g PM, 32.7 g Aromatic 100, and 46.9 g isopropyl alcohol was added to the mixture with slow stirring, and the paint was filtered through a fine mesh paint filter.

EXAMPLES 39–40

Paints were prepared by mixing the ingredients shown in Table 7. Both have calculated stoichiometries of 1 eq. epoxy per 1 eq. amine hydrogen. The ingredients were thoroughly mixed and then drawn down with a 2 mil wet-film-thickness (WFT) bird bar onto cold rolled steel (CRS) panels. Coatings were then drawn down every hour after mixing. The panels were cured in a room with a constant temperature of 25° C. and 50% RH for 24 hours. Gloss was then measured using a gloss meter operated at 200 and 60° angles of incidence, and the degree of exudation was qualitatively evaluated by scraping the back of one's knuckle against the coating. The results demonstrate that a coating prepared from a polyamide resin of the current invention has less exudate and improved gloss relative to Ancamide 260A, a polyamide of conventional technology with a similar viscosity.

TABLE 7

| Example | 39 | 40 |
|---|---|---|
| Pigmented epoxy of Example 38 | 84.23 g | 84.23 g |
| Polyamide of Example 4 | 13.53 g | |
| Ancamide 260A | | 9.82 g |
| Aromatic 100 | 1.12 g | 1.12 g |
| PM | 1.12 g | 1.12 g |
| Isopropanol | 0.56 g | 0.56 g |
| Beetle 216-8 (Cytec) | 1.00 g | 1.00 g |

TABLE 7-continued

| Example | 39 | 40 |
|---|---|---|
| Performance Data | | |
| Initial | | |
| 200 Gloss | 24 | 9.4 |
| 600 Gloss | 70 | 47 |
| Exudate | Slight | Moderate |
| 1 Hour | | |
| 20° Gloss | 49 | 28 |
| 60° Gloss | 86 | 73 |
| Exudate | None Detected | Slight |
| 2 Hours | | |
| 20° Gloss | 52 | 35 |
| 60° Gloss | 89 | 78 |
| Exudate | None | None |

EXAMPLES 41–46

Pigmented epoxy grinds ('A sides') were prepared by the following general procedure using the ingredients of Table 8. In an 800 mL SS vessel was placed all of the Epon 828, and two thirds of the DER-671 PM75 (for 25% pigment volume concentration (PVC) formulations) or all of the DER-671 PM75 (for 35% PVC formulations). The raw materials were then thoroughly mixed with a dispersator fitted with a Cowles blade. Neuosperse 657 (Huls America, Inc.) was added and mixed well, then the Bentone SD-2 (Rheox Inc.) was added and mixed well for 5 minutes. The pigments were then added to the mixture with slow stirring. If the viscosity of the mixture became too thick to stir, then a portion of the Aromatic 100 was added until a high shear viscosity suitable for pigment grinding was achieved. The mixture was then ground until a Hegman grind of 6 or higher was achieved. The mixture was then let down with the remaining ingredients with moderate mixing with flow additive (Beetle 216–10, Cytec Industries, Inc.) added last, and filtered through a fine paint filter. The 'B sides' were prepared by mixing the curing agent and solvents and allowing the ingredients to equilibrate for a minimum of 16 hours. The final paints at 1:1 stoichiometry were prepared in 300 g batches by combining the amounts of A and B sides given in Table 9 and thoroughly hand-mixing the mixtures. The paints were applied to 3"x6" hot rolled steel panels grit blasted to a 2 mil profile. After 2 weeks cure at ambient temperature, 3 panels from each coating were scribed with a 2" vertical incision and placed in a salt spray chamber and subjected to testing according to ASTM B117. After 1000 hours in the test chamber the panels were removed, vigorously scraped along the scribe, and evaluated for degree of creepage from the scribe according to ASTM D1654. The results demonstrate that coatings prepared with polyamide resins of the current invention yield lower viscosity paints than polyamides of comparable viscosity of the current art. At a 25% pigment volume concentration (PVC), they also afford improved corrosion resistance vs. polyamide resins of comparable viscosity of the current art. At a 35% PVC they outperform polyamides of the current art of comparable or even much higher viscosity.

TABLE 8

| Example | 41 | 42 | 43 | 44 | 45 | 46 |
|---|---|---|---|---|---|---|
| A Side | | | | | | |
| DER671 PM75 | 198.23 | 224.37 | 193.51 | 153.87 | 174.16 | 150.11 |
| Epon828 | 66.08 | 74.79 | 64.5 | 51.29 | 58.05 | 50.04 |
| Nevoxy EPX-L5 | 24.89 | 25.05 | 24.78 | 19.32 | 19.44 | 19.23 |
| Nuosperse 657 | 2.91 | 2.91 | 2.91 | 3.66 | 3.69 | 3.68 |
| Aromatic 100 | 52.03 | 32.2 | 50.8 | 23.70 | 8.23 | 26.27 |
| Isopropanol | 31.22 | 35.34 | 30.48 | 24.24 | 27.43 | 23.64 |
| Methyl Propyl ketone | 87.07 | 73.42 | 90.08 | 98.29 | 88.08 | 100.87 |
| Heucophos ZPA (Heucotech Ltd.) | 77.52 | 77.34 | 77.68 | 98.06 | 97.83 | 98.19 |
| SparmiteF | 135.66 | 135.34 | 135.94 | 171.6 | 171.21 | 171.84 |
| Bentone SD-2 | 1.94 | 1.93 | 1.94 | 2.45 | 2.45 | 2.45 |
| Chromium Oxide G-409 | 58.14 | 58.00 | 58.26 | 73.54 | 73.37 | 73.64 |
| Wollastocoat 10ES | 114.34 | 114.07 | 114.58 | 144.64 | 144.30 | 144.83 |
| Beetle 216-10 | 25.00 | 25.00 | 25.00 | 25.00 | 25.00 | 25.00 |
| B Side | | | | | | |
| Polyamide of Ex. 4b | 117.08 | | | 90.89 | | |
| Ancamide 260A | | 90.87 | | | 70.54 | |
| Ancamide 220 | | | 120.83 | | | 93.73 |
| Aromatic 100 | | 26.7 | | 16.7 | 37.49 | 13.13 |
| Methyl Propyl Ketone | 22.90 | 17.67 | 23.71 | 17.77 | 13.71 | 18.39 |

TABLE 9

| Example | 41 | 42 | 43 | 44 | 45 | 46 |
|---|---|---|---|---|---|---|
| g A Side | 257.8 | 259.2 | 257.3 | 262.2 | 263.1 | 262.2 |
| g B Side | 42.2 | 41.8 | 42.7 | 37.8 | 36.9 | 37.8 |
| Calculate Formulation Properties | | | | | | |
| VOC (lb/gal) | 2.81 | 2.81 | 2.81 | 2.81 | 2.81 | 2.81 |
| % Volume Solids | 59.9 | 60.1 | 59.9 | 59.7 | 59.8 | 59.7 |
| % PVC | 24.6 | 24.6 | 24.6 | 34.3 | 34.3 | 34.3 |
| Anticorrosive Pigment as % of Total Pigment (v/v) | 25.0 | 25.0 | 25.0 | 25.0 | 25.0 | 25.0 |
| Measure Properties | | | | | | |
| Initial Viscosity (cP) | 476 | 698 | 702 | 376 | 761 | 814 |
| Panel 1 | | | | | | |
| DFT (mil) | 2.70+/−.19 | 3.28+/−.25 | 3.05+/−.25 | 3.87+/−.24 | 3.92+/−.36 | 3.54+/−.18 |
| Avg. Creep (mm) | .49 | .88 | .26 | .10 | .26 | .53 |
| Panel 2 | | | | | | |
| DFT | 2.74+/−.14 | 3.15+/−.30 | 2.77+/−.19 | 3.62+/−.23 | 3.35+/−.30 | 3.49+/−.37 |
| Avg. Creep (mm) | .42 | .31 | .27 | .14 | .90 | .45 |
| Panel 3 | | | | | | |
| DFT | 2.87+/−.26 | 3.09+/−.20 | 2.71+/−.22 | 3.18+/−.14 | 3.50+/−.35 | 3.58+/−.20 |
| Avg. Creep (mm) | .58 | .63 | .35 | .24 | .91 | .56 |
| Grand Avg. Creep | .50 | .61 | .29 | .16 | .69 | .51 |

STATEMENT OF INDUSTRIAL APPLICATION

The invention provides polyamide curing agents for epoxy resin coating compositions.

We claim:

1. An epoxy hardener composition comprising the reaction product of a mixture comprising
   (a) a fatty mono-acid,
   (b) a dimer acid,
   (c) a polyethylene amine of the structure:

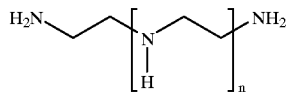

where n is an integer ranging from 1 to about 6, and
   (d) a piperazine-containing polyamine which is piperazine or N-amino-(C2–C6)-alkylpiperazine,
reacted in the following ratios:

(1) 0.001–1:1 equivalents of fatty mono-acid per equivalents dimer acid;
(2) 0.1–1:1 moles of piperazine-containing polyamine per mole of polyethyleneamine; and
(3) 0.6–1.2:1 moles of total polyamines per equivalents of total acid.

2. The epoxy hardener composition of claim 1 in which the fatty mono-acid is tall oil fatty acid and/or soya fatty acid.

3. The epoxy hardener composition of claim 1 in which the dimer acid is 75 to 90 wt % dimeric acids.

4. The epoxy hardener composition of claim 1 in which the polyethylene amine is triethylenetetramine and/or tetraethylenepentamine.

5. The epoxy hardener composition of claim 1 in which the piperazine-containing polyamine is piperazine and/or aminoethylpiperazine.

6. The epoxy hardener composition of claim 1 in which 0.05–0.35:1 equivalents of fatty mono-acid per equivalents dimer acid are reacted.

7. The epoxy hardener composition of claim 1 in which 0.3–0.8:1 moles of piperazine-containing polyamine per mole of polyethyleneamine are reacted.

8. The epoxy hardener composition of claim 1 in which 0.9–1.15:1 moles of total polyamines per equivalents of total acid are reacted.

9. The epoxy hardener composition of claim 1 in which the fatty mono-acid is tall oil fatty acid and/or soya fatty acid, the dimer acid is 75 to 90 wt % dimeric acids, the polyethylene amine is triethylenetetramine and the piperazine-containing polyamine is aminoethylpiperazine.

10. An epoxy hardener composition comprising the reaction product of a mixture comprising
(a) a fatty mono-acid,
(b) a dimer acid,
(c) a polyethylene amine of the structure:

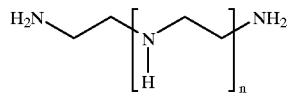

where n is an integer ranging from 1 to about 6, and
(d) a piperazine-containing polyamine which is piperazine or N-amino-(C2–C6) alkylpiperazine,
reacted in the following ratios:
(1) 0.05–0.35:1 equivalents of fatty mono-acid per equivalents dimer acid;
(2) 0.3–0.8:1 moles of piperazine-containing polyamine per mole of polyethyleneamine; and
(3) 0.9–1.15:1 moles of total polyamines per equivalents of total acid.

11. The epoxy hardener composition of claim 10 in which the fatty mono-acid is tall oil fatty acid and/or soya fatty acid.

12. The epoxy hardener composition of claim 10 in which the dimer acid is 75 to 90 wt % dimeric acids.

13. The epoxy hardener composition of claim 10 in which the polyethylene amine is triethylenetetramine and/or tetraethylenepentamine.

14. The epoxy hardener composition of claim 10 in which the piperazine-containing polyamine is piperazine and/or aminoethylpiperazine.

15. The epoxy hardener composition of claim 10 in which the fatty mono-acid is tall oil fatty acid and/or soya fatty acid, the dimer acid is 75 to 90 wt % dimeric acids, the polyethylene amine is triethylenetetramine and/or tetraethylenepentamine and the piperazine-containing polyamine is piperazine and/or aminoethylpiperazine.

16. The epoxy hardener composition of claim 10 in which the dimer acid is 75 to 90 wt % dimeric acids, the polyethylene amine is triethylenetetramine and the piperazine-containing polyamine is aminoethylpiperazine.

17. The epoxy hardener composition of claim 10 in which 0.15–0.25:1 equivalents of fatty mono-acid per equivalents dimer acid are reacted.

18. The epoxy hardener composition of claim 15 in which 0.1 5–0.25:1 equivalents of fatty mono-acid per equivalents dimer acid are reacted.

19. The epoxy hardener composition of claim 16 in which 0.15–0.25:1 equivalents of fatty mono-acid per equivalents dimer acid are reacted.

20. An epoxy hardener composition comprising two or more components selected from the group consisting of
(a) a fatty mono-acid,
(b) a dimer acid,
(c) a polyethylene amine,
(d) a piperazine-containing polyamine which is piperazine or N-amino-(C2–C6)-alkylpiperazine,
(e) the reaction product of a polyethyleneamine and a dimer acid;
(f) the reaction product of a piperazine-containing polyamine which is piperazine or N-amino-(C2–C6)-alkylpiperazine and a dimer acid;
(g) the reaction product of a piperazine-containing polyamine which is piperazine or N-amino-(C2–C6)-alkylpiperazine and a fatty mono-acid;
(h) the reaction product of a polyethyleneamine and a fatty mono-acid;
(i) the reaction product of a polyethyleneamine, a piperazine-containing polyamine which is piperazine or N-amino-(C2–C6)-alkylpiperazine and a dimer acid;
k) the reaction product of a polyethyleneamine, a piperazine-containing polyamine which is piperazine or N-amino-(C2–C6)-alkylpiperazine and a fatty mono-acid;
(k) the reaction product of a polyethyleneamine, a piperazine-containing polyamine which is piperazine or N-amino-(C2–C6)-alkylpiperazine, a dimer acid and a fatty mono-acid;
(l) the reaction product of a polyethyleneamine, a dimer acid and a fatty mono-acid; and
(m) the reaction product of a piperazine-containing polyamine which is piperazine or N-amino-(C2–C6)-alkylpiperazine, a dimer acid and a fatty mono-acid;
the polyethyleneamine being of the structure:

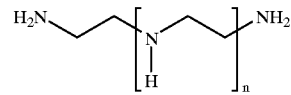

where n is an integer ranging from 1 to about 6 and in amounts sufficient to provide the following ratios:
(1) 0.001–1:1 equivalents of fatty mono-acid per equivalents dimer acid;
(2) 0.1–1:1 moles of piperazine-containing polyamine per mole of polyethyleneamine; and
(3) 0.6–1.2:1 moles of total polyamines per equivalents of total acid.

21. The epoxy hardener composition of claim 20 in which the ratios are
  (1) 0.05–0.35:1 equivalents of fatty mono-acid per equivalents dimer acid;
  (2) 0.3–0.8:1 moles of piperazine-containing polyamine per mole of polyethyleneamine; and
  (3) 0.9–1.15:1 moles of total polyamines per equivalents of total acid.

22. The epoxy hardener composition of claim 20 in which the fatty mono-acid is tall oil fatty acid and/or soya fatty acid, the dimer acid is 75 to 90 wt % dimeric acids, the polyethylene amine is triethylenetetramine and/or tetraethylenepentamine and the piperazine-containing polyamine is piperazine and/or aminoethylpiperazine.

23. A protective or decorative coating composition comprising a polyepoxide resin and an epoxy hardener composition of claim 1.

24. A protective or decorative coating composition comprising a polyepoxide resin and an epoxy hardener composition of claim 10.

25. A protective or decorative coating composition comprising a polyepoxide resin and an epoxy hardener composition of claim 20.

* * * * *